(12) United States Patent
Thackston et al.

(10) Patent No.: US 6,345,583 B1
(45) Date of Patent: Feb. 12, 2002

(54) BI-DIRECTIONAL DAMPENING DEVICE AND METHOD THEREFOR

(76) Inventors: Willie L. Thackston; June M. Thackston, both of 2299 Goodrum La., Marietta, GA (US) 30066

( * ) Notice: Subject to any disclaimer, the term of this patent is extended or adjusted under 35 U.S.C. 154(b) by 0 days.

(21) Appl. No.: 09/614,042

(22) Filed: Jul. 11, 2000

(51) Int. Cl.$^7$ .............................................. B63B 21/00
(52) U.S. Cl. ..................... 114/213; 114/230.24; 267/71; 267/74
(58) Field of Search .................................. 114/213, 215, 114/230.18, 230.24; 267/70, 71, 73, 74

(56) References Cited

U.S. PATENT DOCUMENTS

| | | | |
|---|---|---|---|
| 727,175 A | * 5/1903 | Miller | 114/215 |
| 2,775,830 A | * 1/1957 | Kenyon | 267/70 |
| 3,004,391 A | 10/1961 | Miller | |
| 3,854,706 A | 12/1974 | Johnston | |
| 4,653,736 A | * 3/1987 | Pontoppidan | 267/70 |
| 4,681,303 A | * 7/1987 | Grassano | 267/70 |
| 4,697,538 A | 10/1987 | Day | |
| 4,804,298 A | 2/1989 | Nasby, Jr. | |
| 4,955,309 A | 9/1990 | Ciccone | |
| 5,088,143 A | 2/1992 | Alexander | |
| 5,138,965 A | 8/1992 | Culp | |
| 5,307,753 A | 5/1994 | Besonen, Sr. et al. | |
| 5,333,845 A | 8/1994 | Seiichi | |
| 5,524,566 A | 6/1996 | Rapa et al. | |
| 5,694,879 A | 12/1997 | Taylor | |
| 5,832,861 A | 11/1998 | Taylor | |
| 5,906,173 A | 5/1999 | Day, Jr. et al. | |

* cited by examiner

*Primary Examiner*—Sherman Basinger
(74) *Attorney, Agent, or Firm*—Joel Myers; Myers & Associates, Intellectual Property Law, P.C.

(57) ABSTRACT

A bi-directional shock absorbing apparatus for attenuating undesirable dock movement, wherein two independent rods, one associated with a dock and the other with a fixed object, receive forces from the raising and lowering of the dock and transfer these forces to the respective ends of a coiled spring providing a balanced, bi-directional dampening affect.

18 Claims, 6 Drawing Sheets

BI-DIRECTIONAL DAMPENING DEVICE AND METHOD THEREFOR

TECHNICAL FIELD

The present invention relates generally to shock-absorbing devices and, more specifically, to a shock-absorbing device capable of dampening bi-directional forces and method therefor. The present invention is particularly useful in, although not strictly limited to, marine applications desiring reduction of water motions such as mooring lines for floating docks and boats.

BACKGROUND OF THE INVENTION

The increasing popularity of water sports and activities has dramatically affected the number of individuals making use of coastal and inland waters such as lakes, inlets and canals. A direct result is increased watercraft traffic and artificially generated wake. These wakes alone or in combination with the natural wind and wave action created by various weather conditions, create annoying conditions for water enthusiasts recreating on floating docks. In addition, tumultuous water conditions resulting in uncontrolled dock movements can cause damage to moored docks as well as personal injury.

Several attempts have been made to design a suitable and effective device for attenuating dock movement in response to waves. Examples of such devices may be found by reference to U.S. Pat. No. 4,955,309 to Ciccone, U.S. Pat. No. 5,307,753 to Besonen, Sr. et al., U.S. Pat. No. 5,524,566 to Rapa et al., U.S. Pat. No. 5,694,879 to Taylor, and U.S. Pat. No. 5,832,861 to Taylor. However, in view of the present invention, these patents are disadvantageous.

For instance, the configuration of U.S. Pat. No. 4,955,309 consists of a tubular housing, a concentric plunger member, and a resilient coiled compression spring. A disadvantage of this design is the uneven dampening that occurs from only one plunger member acting on the spring. Even if another plunger and spring combination were added to receive opposing forces, the uneven dampening effect would remain as a product of the independence of the plungers and springs.

Another configuration, described in U.S. Pat. No. 5,524,566, incorporates an automobile shock absorber in place of a compression spring in an effort to eliminate resonance. This change, while it may alleviate some minimal sounds, does not alleviate the potentially dramatic uneven dampening effect that occurs from a one-sided plunger/damper setup.

The alternative device of U.S. Pat. No. 5,832,861 describes a multi-spring unit with self-described dynamic load transferring characteristics resulting from forces causing one spring to extend and an identical counterpart to compress. One disadvantage of this design is that the compressed size of the partner spring limits the extension of the extension spring.

U.S. Pat. No. 5,307,753 teaches an extension-biasing member in place of a compression spring. A disadvantage inherent in the use of an extension-biasing member is that the device is pulled by the wave action in the same direction as the spring extends. With large forces, the inner cord may snap thereby overextending the spring, destructively affecting the elasticity.

Therefore, it is readily apparent that there is a need for a dampening device wherein two independent rods receive opposing forces and compress the respective ends of a coiled spring thereby providing a balanced, bi-directional dampening affect and thus preventing the above-discussed disadvantages.

BRIEF SUMMARY OF THE INVENTION

Briefly described, in a preferred embodiment, the present invention overcomes the above-mentioned disadvantages, and meets the recognized need for such a device, by providing a bi-directional dampening device wherein two independent rods, one associated preferably with a dock and the other with a fixed object, receive forces from the raising and lowering of the dock and transfer these forces to the respective ends of a coiled spring thereby providing a bi-directional dampening affect.

According to its major aspects and broadly stated, the present invention is a dampening device having two independent rods attached at distal ends to securing plates wherein forces on the rod are transferred to the respective ends of the spring and dampened thereby.

More specifically, the present invention is a dampening device with two independent rods positioned inside a heavy-duty spring. A support plate is positioned on each end of the spring, wherein the distal end of each rod is secured to the respective plate, and wherein the proximal ends of each rod extend through a throughhole in the respective plate and is allowed to slide therethrough. An eyebolt member is attached to each proximal end of each rod for securing a cable therethrough, with one cable secured to a dock and the other cable secured to a fixed object. As the dock raises and lowers in response to water conditions, the shock device receives and transfers the forces to the respective ends of the heavy-duty coiled spring thereby compressing the spring and providing a balanced, bi-directional dampening affect.

A feature and advantage of the present invention is the ability of such a device to provide a bi-directional shock absorber that is simple in construction and thus easy to manufacture.

A feature and advantage of the present invention is the ability of such a device to provide a balanced bi-directional dampening effect.

A feature and advantage of the present invention is the ability of one heavy-duty coiled spring to receive and dampen forces from two independent and opposing rods.

A feature and advantage of the present invention is the ability of a heavy-duty coiled spring compression device to limit and maintain the distance between a moored object and an anchoring device.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

In describing the preferred and alternate embodiments of the present invention, as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
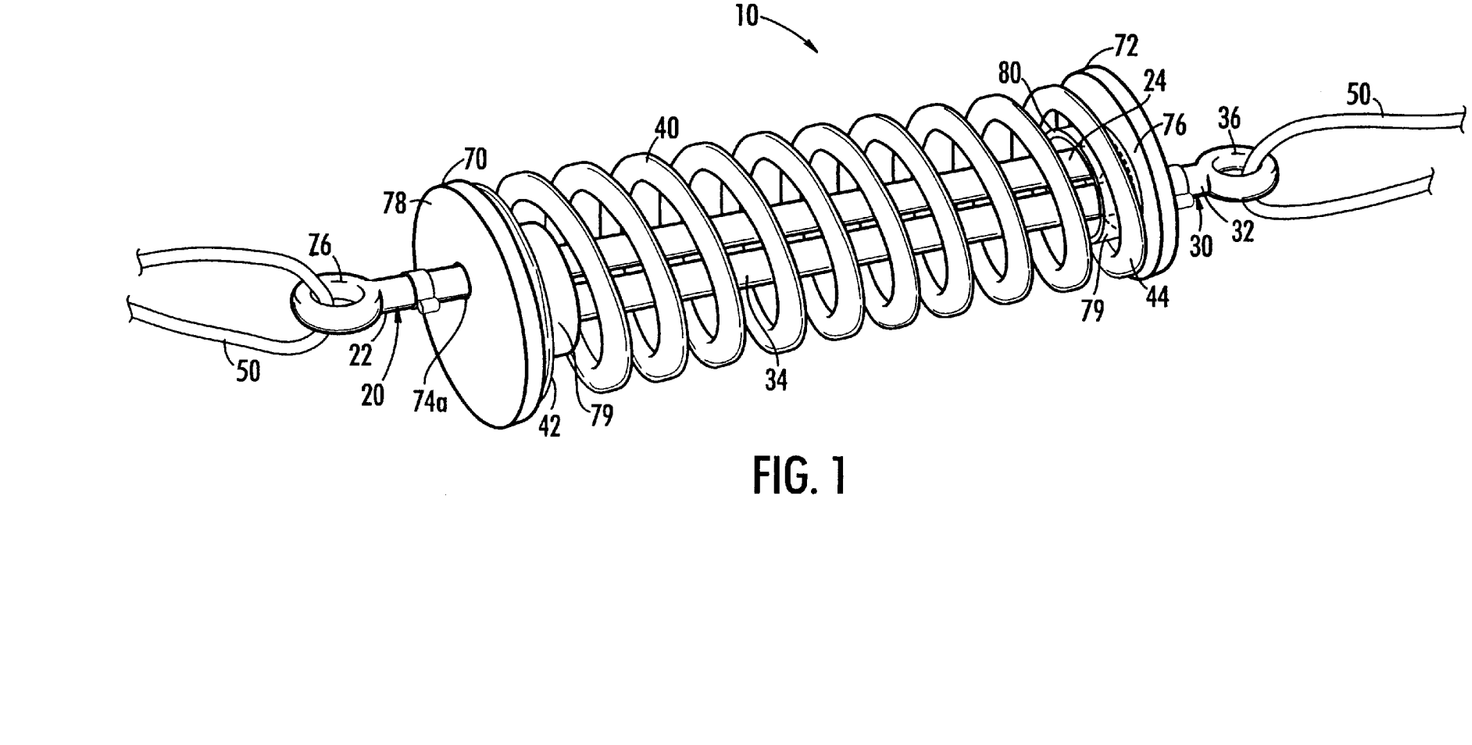
FIG. 1 is a perspective view of a dampening device according to a preferred embodiment of the present invention showing a cable connected on each end.
Figure 3:
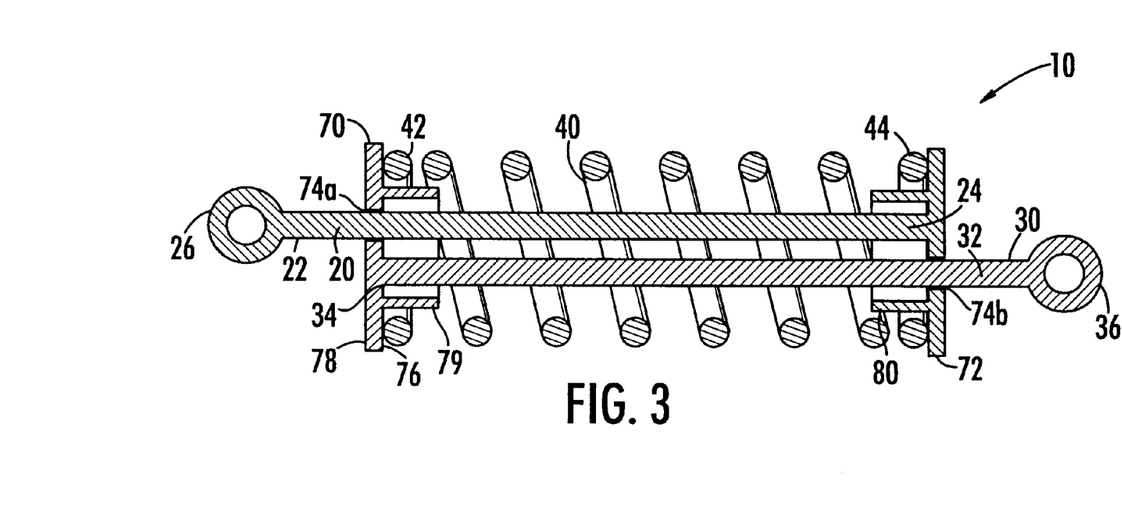
FIG. 3 is a sectional view of a dampening device according to a preferred embodiment of the invention showing the spring in an uncompressed state and the rods are at rest.
Figure 4:
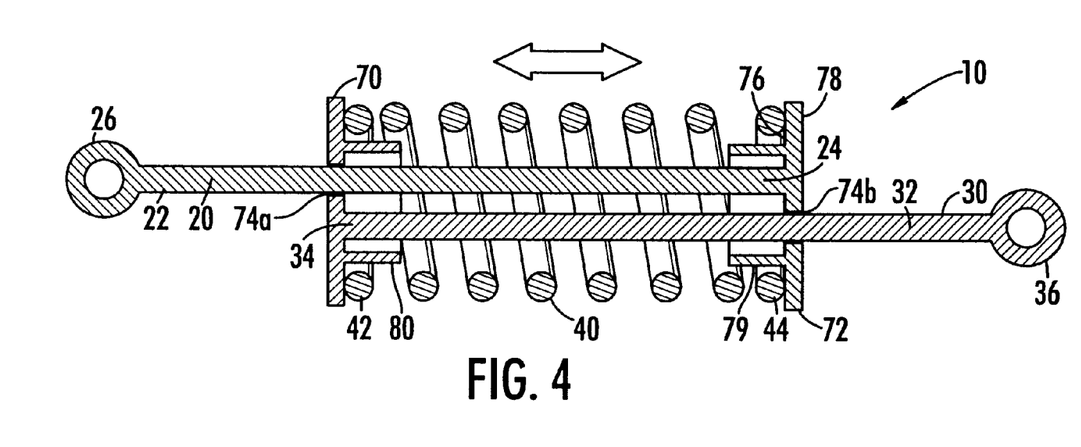
FIG. 4 is a sectional view of a dampening device according to a preferred embodiment of the invention showing the spring in a compressed state.

Referring now to FIG. 1 and FIGS. 3–4, the present invention is a dampening device 10 comprising two independent rods 20 and 30 positioned within a spring 40. Each independent rod 20 and 30 has a proximal end 22 and 32, respectively, and a distal end 24 and 34, respectively. Rod 20 is aligned parallel with and in opposing direction to rod 30, such that proximal end 22 of rod 20 is proximate to distal end 34 of rod 30 and distal end 24 of rod 20 is proximate to proximal end 32 of rod 30. An eyebolt member 26 and 36 is attached to each proximal end 22 and 32, respectively, of each rod 20 and 30, respectively.

Preferably, support plates 70 and 72 are generally circular, have an inner surface 76, an outer surface 78, and are positioned on ends 42 and 44, respectively, of coiled spring 40. A wall 79 extends outwardly from inner surface 76 of support plates 70 and 72, thereby defining a generally circular guide 80 adjacent to the support plates 70 and 72 and within the wall 79. The coiled spring 40 encircles wall 79 and is held in alignment by guide 80.

In a preferred form, a cable A and B is secured through each eyebolt 26 and 36, respectively, wherein cable A is secured to a dock and wherein cable B is secured to a fixed object. It is contemplated, and one skilled in the art will recognize, that although cable is the preferred flexible linking apparatus, alternatives may be used such as, for exemplary purposes only, rope, chain, bungee cord or marine line. It is also contemplated that a rigid, nonflexible linking apparatus may be utilized such as, for exemplary purposes only, rods or beams formed from any suitable rigid material. In addition, a combination of flexible and non-flexible links may be utilized.

Figure 2:
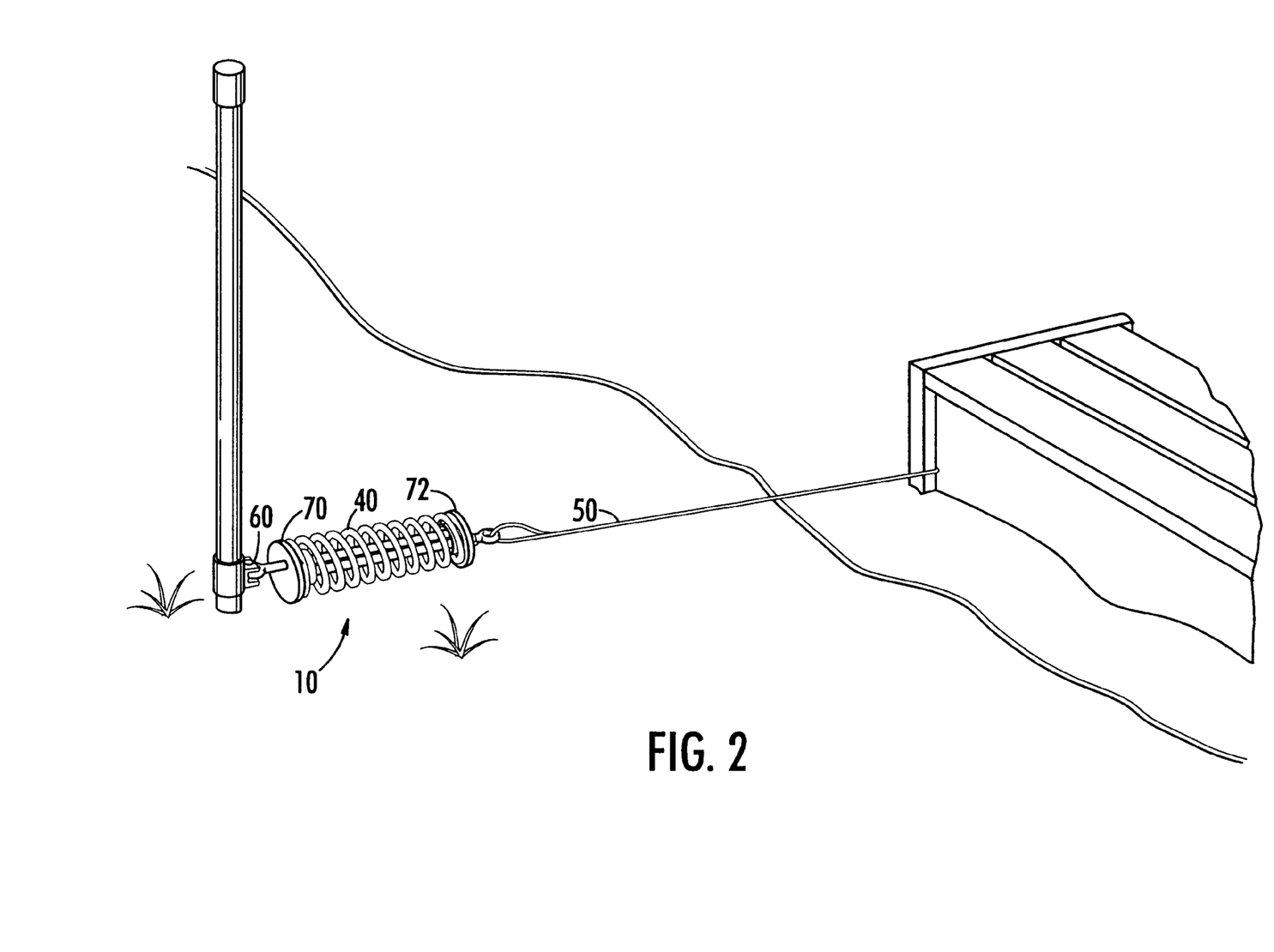
FIG. 2 is a perspective view of a dampening device according to a preferred embodiment of the present invention showing one end of the shock is secured to a stationary object and the other end of the shock is attached to a dock via a cable.

In an alternate embodiment, as best seen in FIG. 2, the cable A is secured through one eyebolt member 26 on rod 20, and a pin 60 is secured through one eyebolt member 36 of the opposing rod 30 to provide a means of directly securing dampening device 10 to a fixed object.

The distal end 24 and 34 of each rod 20 and 30, respectively, is secured to the inner surface 76 of the respective support plate 70 and 72, wherein the proximal end 22 and 32 of each respective rod 20 and 30 extends through a throughhole 74a and 74b in the respective plate 70 and 72 and is allowed to slide therethrough. This allows forces generated as the dock raises and lowers to be transferred from the rod 20 and 30 to the spring 40, wherein the spring 40 is compressed thereby dampening the force.

In an alternate embodiment, eyebolt members 26 and 36 could be rotatably attached to allow for swiveling.

In another alternate embodiment, eyebolt members 26 and 36 could include quick-connect clamp features well-known in the art to allow for easy attachment and removal of cables or bolts.

In yet another alternate embodiment, a bellowed housing could surround spring 40 and be dimensioned to allow full extension and compression of spring 40 while providing erosion protection.

Figure 5:
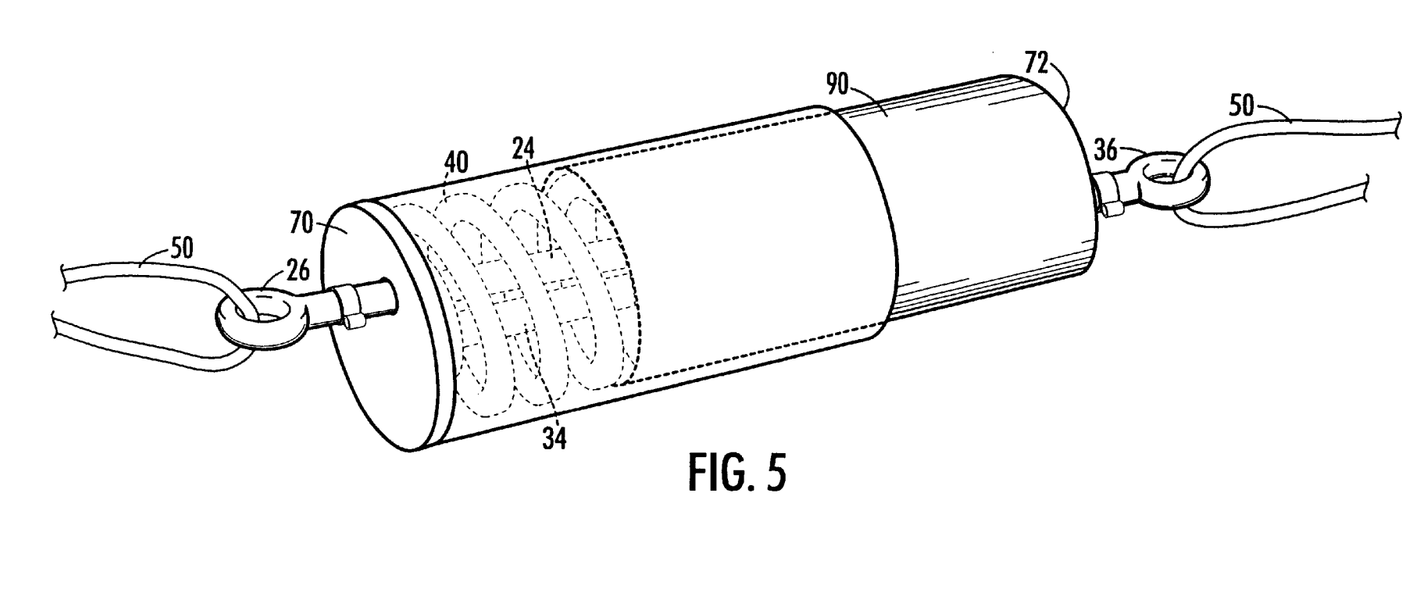
FIG. 5 is a perspective view of a dampening device according to an alternate embodiment of the present invention showing a telescoping cover thereon.

In still another alternate embodiment, as shown in FIG. 5, a telescoping housing 90 surrounds spring 40 and support plates 70 and 72 to allow for extension and compression of spring 40 while providing erosion protection and safety protection.

In another alternate embodiment, a cushioned housing could surround the device to allow for use in securing floating vessels in confined areas without potential damage thereto.

Figure 6:
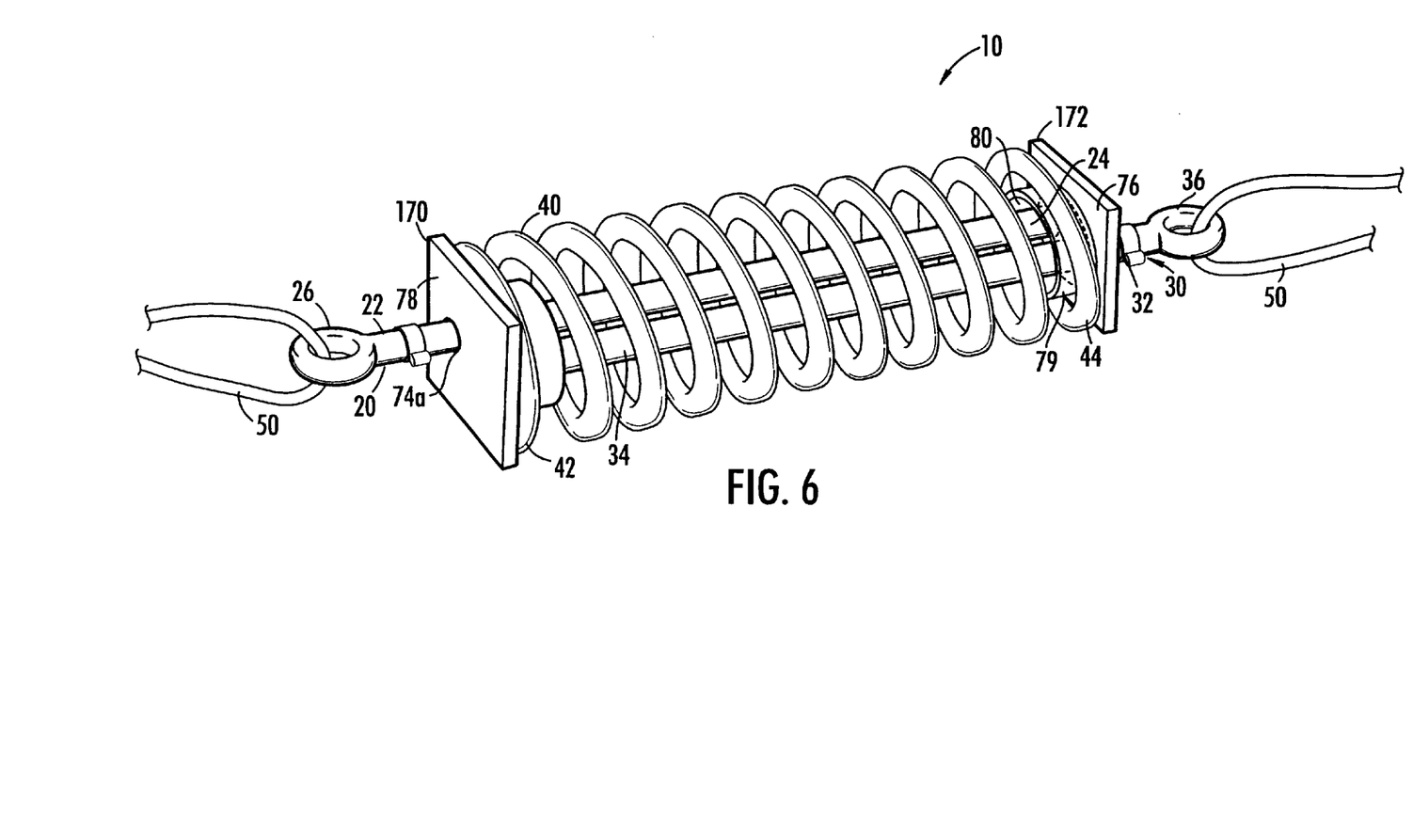
FIG. 6 is a perspective view of a dampening device according to an alternate embodiment of the present invention showing a cable connected on each end.
Figure 7:
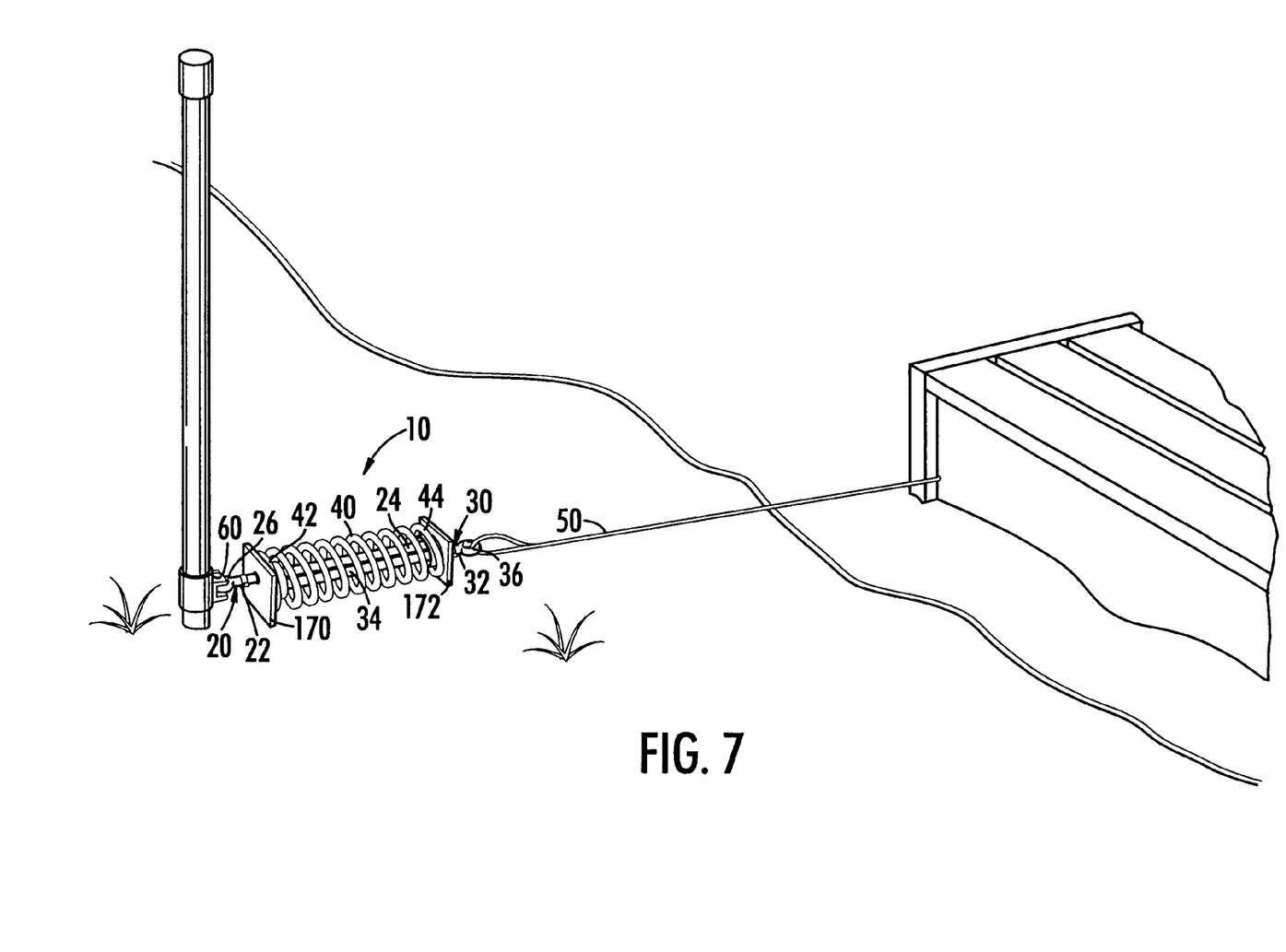
FIG. 7 is a perspective view of a dampening device according to an alternate embodiment of the present invention showing one end of the shock is secured to a stationary object and the other end of the shock is attached to a dock via a cable.

In another alternate embodiment, as shown in FIGS. 6–7, support plates 170 and 172 are rectangular.

In use, one end of the bi-directional shock absorber is anchored to a fixed object such as a pole, piling or secured cleat, either directly or with a linking cable, and the other end of the bi-directional shock absorber is linked with a cable to a floating vessel or dock. Waves create a force on proximal ends 22 and 32 of rods 20 and 30 which causes support plates 70 and 72 to move toward each other, compressing spring 40 and attenuating dock movement resulting from the waves.

One skilled in the art will recognize that dampening device 10 could readily be secured to other floating vessels such as, for exemplary purposes only, boats, piers, rigs, yachts, buoys or markers, wherein it is desired to lessen the rocking effect of waves.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A dampening device for moderating bi-directional forces received at each end thereof, comprising:

a first support plate having a first side, a second side and a throughhole;

a second support plate having a first side, a second side and a throughhole;

a spring having a first end, a second end and an axial center, said first end in contact with said first side of said first support plate, said second end of said spring in contact with said first side of said second support plate;

a first rod having a first end and a second end, said first end of said first rod attached to said second plate, said second end of said first rod extending through said throughhole of said first support plate;

a second rod having a first end and a second end, said first end of said second rod attached to said first plate, said second end of said second rod extending through said throughhole of said second support plate, wherein said first rod and said second rod are positioned proximal to one another and proximate to said axial center of said spring;

a first attaching means carried by said second end of said first rod; and a second attaching means carried by said second end of said second rod, wherein forces exerted on said first attaching means and said second attaching means in a direction away from said second side of said first support plate and said second side of said second support plate, respectively, results in said first support plate and said second support plate being pulled toward each other thereby compressing said spring and thus, dampening said forces, and wherein forces exerted on said first attaching means and said second attaching means in a direction toward said first side of said first support plate and said first side of said second support plate, respectively, results in said first support plate and said second support plate being pushed away from each other thereby decompressing said spring and thus, dampening said forces.

2. The dampening device of claim 1, wherein said first attaching means and said second attaching means are eye members.

3. The dampening device of claim 1, wherein said first attaching means and said second attaching means are quick-connect fittings.

4. The dampening device of claim 1, wherein said first support plate and said second support plate are generally circular shaped.

5. The dampening device of claim 1, wherein said first support plate and said second support plate are generally rectangular shaped.

6. The dampening device of claim 1, wherein said first attaching means and said second attaching means are rotatably attached.

7. The dampening device of claim 1, further comprising a first guide wall extending from said first side of said first support plate and a second guide wall extending from said first side of said second support plate, wherein said first guide wall and said second guide wall are dimensioned to fit within said first end and said second end of said spring, respectively.

8. The dampening device of claim 1, further comprising a housing carried around and substantially covering said spring.

9. The dampening device of claim 8, wherein said housing is telescoping.

10. The dampening device of claim 8, wherein said housing is flexible.

11. A bi-directional dampening device, comprising:

a first support plate having a first side, a second side and a throughhole;

a second support plate having a first side, a second side and a throughhole;

a spring having a first end, a second end and an axial center, said first end in contact with said first side of said first support plate, said second end of said spring in contact with said first side of said second support plate;

a first rod having a first end and a second end, said first end of said first rod attached to said second plate, said second end of said first rod extending through said throughhole of said first support plate;

a second rod having a first end and a second end, said first end of said second rod attached to said first plate, said second end of said second rod extending through said throughhole of said second support plate, wherein said first rod and said second rod are positioned proximal to one another and proximate to said axial center of said spring;

a first attaching means carried by said second end of said first rod;

a second attaching means carried by said second end of said second rod;

a first guide wall extending from said first side of said first support plate; and a second guide wall extending from said first side of said second support plate, said first guide wall and said second guide wall dimensioned to fit within said first end and said second end of said spring, respectively, wherein forces exerted on said first attaching means and said second attaching means in a direction away from said second side of said first support plate and said second side of said second support plate, respectively, results in said first support plate and said second support plate being pulled toward each other thereby compressing said spring and thus, dampening said forces, and wherein forces exerted on said first attaching means and said second attaching means in a direction toward said first side of said first support plate and said first side of said second support plate, respectively, results in said first support plate and said second support plate being pushed away from each other thereby decompressing said spring and thus, dampening said forces.

12. The dampening device of claim 11, wherein said first attaching means and said second attaching means are eye members.

13. The dampening device of claim 11, wherein said first attaching means and said second attaching means are quick-connect fittings.

14. The dampening device of claim 11, wherein said first attaching means and said second attaching means are rotatably attached.

15. The dampening device of claim 11, further comprising a housing carried around and substantially covering said spring.

16. The dampening device of claim 15, wherein said housing is telescoping.

17. The dampening device of claim 15, wherein said housing is flexible.

18. A method of providing bi-directional shock absorption to a floating object, comprising the steps of:

a. obtaining a shock absorbing apparatus comprising a first support plate having a first side, a second side and a throughhole; a second support plate having a first side, a second side and a throughhole; a spring having a first end, a second end and an axial center, said first end in contact with said first side of said first support plate, said second end of said spring in contact with said first side of said second support plate; a first rod having a first end and a second end, said first end of said first rod attached to said second plate, said second end of said first rod extending through said throughhole of said first support plate; a second rod having a first end and a second end, said first end of said second rod attached to said first plate, said second end of said second rod extending through said throughhole of said second support plate, wherein said first rod and said second rod are positioned proximal to one another and proximate to said axial center of said spring; a first attaching means carried by said second end of said first rod; and a second attaching means carried by said second end of said second rod;

b. attaching said first attaching means to the floating object; and c. attaching said second attaching means to a fixed object, wherein forces exerted by movement of the floating object on said first attaching means in a direction away from said second side of said first support plate results in said first support plate and said second support plate being pulled toward each other thereby compressing said spring and thus, dampening said forces, and wherein forces exerted by movement of the floating object on said first attaching means in a direction toward said second side of said first support plate results in said first support plate and said second support plate being pushed away from each other thereby decompressing said spring and thus, dampening said forces.

\* \* \* \* \*